No. 851,689. PATENTED APR. 30, 1907.
A. L. McMURTRY.
MOTOR VEHICLE.
APPLICATION FILED JAN. 28, 1907.

UNITED STATES PATENT OFFICE.

ALDEN L. McMURTRY, OF NEW YORK, N. Y.

MOTOR-VEHICLE.

No. 851,689.  Specification of Letters Patent.  Patented April 30, 1907.

Application filed January 28, 1907. Serial No. 354,393.

*To all whom it may concern:*

Be it known that I, ALDEN L. MCMURTRY, a citizen of the United States, residing in the borough of Manhattan, city, county, and State of New York, have invented certain Improvements in Motor-Vehicles, of which the following is a specification.

This invention provides simple means for securely holding and carrying upon an automobile one or more wheel rims with tires for emergency use.

Figure 1:
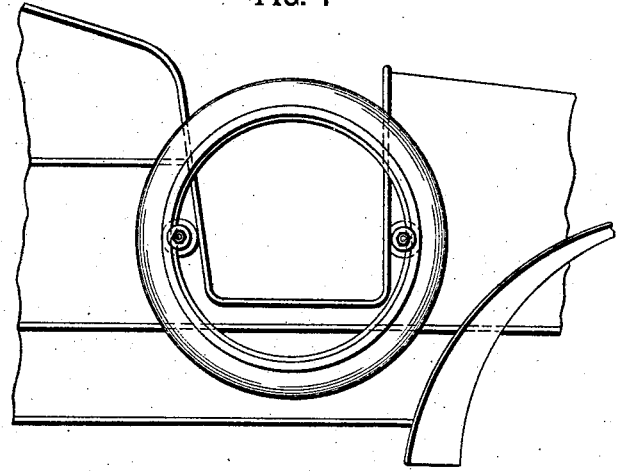
Figure 2:
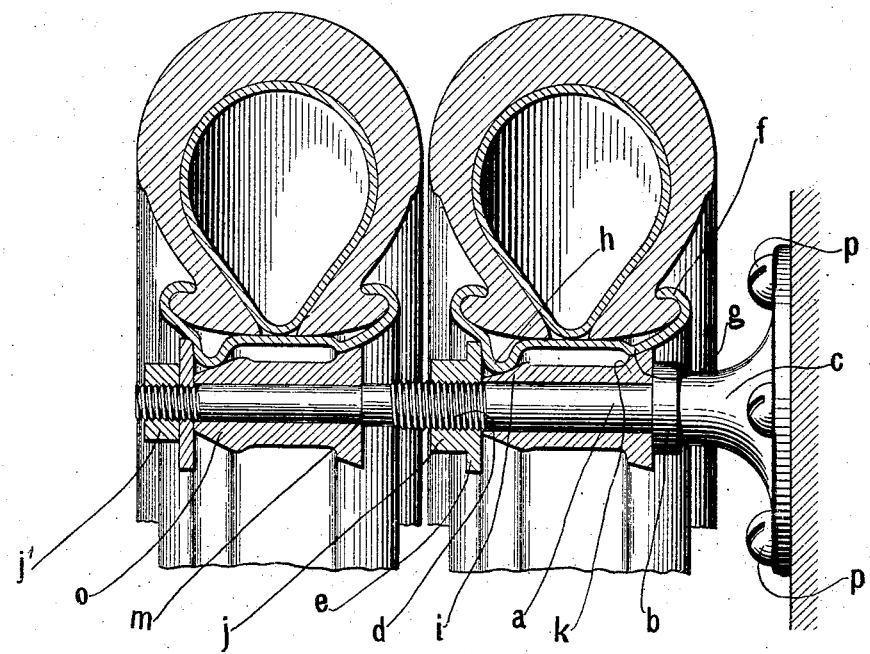

In the accompanying drawings: Figure 1 is a side elevation showing a portion of a motor driven vehicle in side elevation indicating the location and general character of the reserve rim-carrying devices: Fig. 2 is an enarged sectional view, the section being longitudinal through one of the rim supporting devices.

The reserve rims are each shown as carrying a shoe and inflated air tube all ready to be put into use. On the side of the body of the vehicle are projecting bolts *a* which serve to support the rims. Two such bolts are sufficient and they may be, as indicated in Fig. 1, arranged respectively at the sides of one of the entrances of the vehicle. Adjacent the body of the vehicle each bolt *a* is provided with an abutment collar *b* which may form part of the bracket *c*, bolted to the car body, in which the bolt is mounted. Intermediate its ends, the bolt is threaded as at *d* for the reception of a clamp nut *e*. If it is designed that only one reserve rim be carried, the bolt need not extend beyond this threaded portion. The rim *f* has two seating surfaces *g, h*, of unequal radius which may be formed by rolling in the integral continuous rim suitable depressions or corrugations. I therefore mount upon the bolt *a*, a sleeve having two inclined rim seats *i, k*, of unequal height. The rim *f* is adapted to fit over the sleeve and to be clamped thereon with a wedging action. When so placed in position, the rims may be clamped by nuts *j* screwing upon the threaded portion *d* of the bolt. If it is designed that the two bolts shall carry two rims, then the bolt is extended as in Fig. 2 being formed with a shoulder *m* against which the second sleeve *o* surrounding the bolt may abut and upon which the second rim with its shoe and inflated tube may be clamped by a second nut *j*. In this way, two reserve rims may conveniently be carried in such a way as to be readily detached for use when required and upon its support may be placed a rim removed from the wheel with its injured shoe or deflated inner tube. The brackets supporting the bolts *a* may readily be removed from the body of the vehicle by unscrewing the bolts *p*.

I claim:

1. A motor driven vehicle comprising reserve rim supporting devices consisting of oppositely disposed bolts projecting laterally from the body of the vehicle, a suitable rim seat carried by each bolt and adapted to receive a wheel rim, and rim retaining nuts screwing upon threads of the bolt and acting to clamp the rim on said seat to hold said rim in position.

2. A motor driven vehicle comprising reserve rim supporting devices consisting of oppositely disposed bolts projecting laterally from the body of the vehicle, each bolt being threaded at its end and intermediate its ends a rim seat between the intermediate thread and the body of the carriage adapted to receive and hold a wheel rim, a clamp nut on this threaded portion of each bolt, a second rim seat carried by each bolt and located between its end and the intermediate thread thereof and a rim retaining clamp nut on the end thread of each bolt.

3. A motor driven vehicle comprising reserve rim supporting devices consisting of oppositely disposed bolts projecting laterally from the body of the vehicle, a rim seat carried by each bolt consisting of a circular sleeve surrounding the bolt, formed with inclined rim seats of unequal height and adapted to receive a wheel rim having corresponding surfaces adapted to fit upon the rim seats and rim retaining nuts applied to threaded portions of the bolt.

4. A motor driven vehicle comprising reserve rim supporting devices consisting of oppositely disposed bolts projecting laterally from the body of the vehicle, a suitable rim seat carried by each bolt and adapted to receive a wheel rim, and means acting upon the wheel rim to retain it in position on the rim seat.

In testimony whereof, I have hereunto subscribed my name.

ALDEN L. McMURTRY.

Witnesses:
L. F. BROWNING,
E. F. WICKS.